Patented June 14, 1938

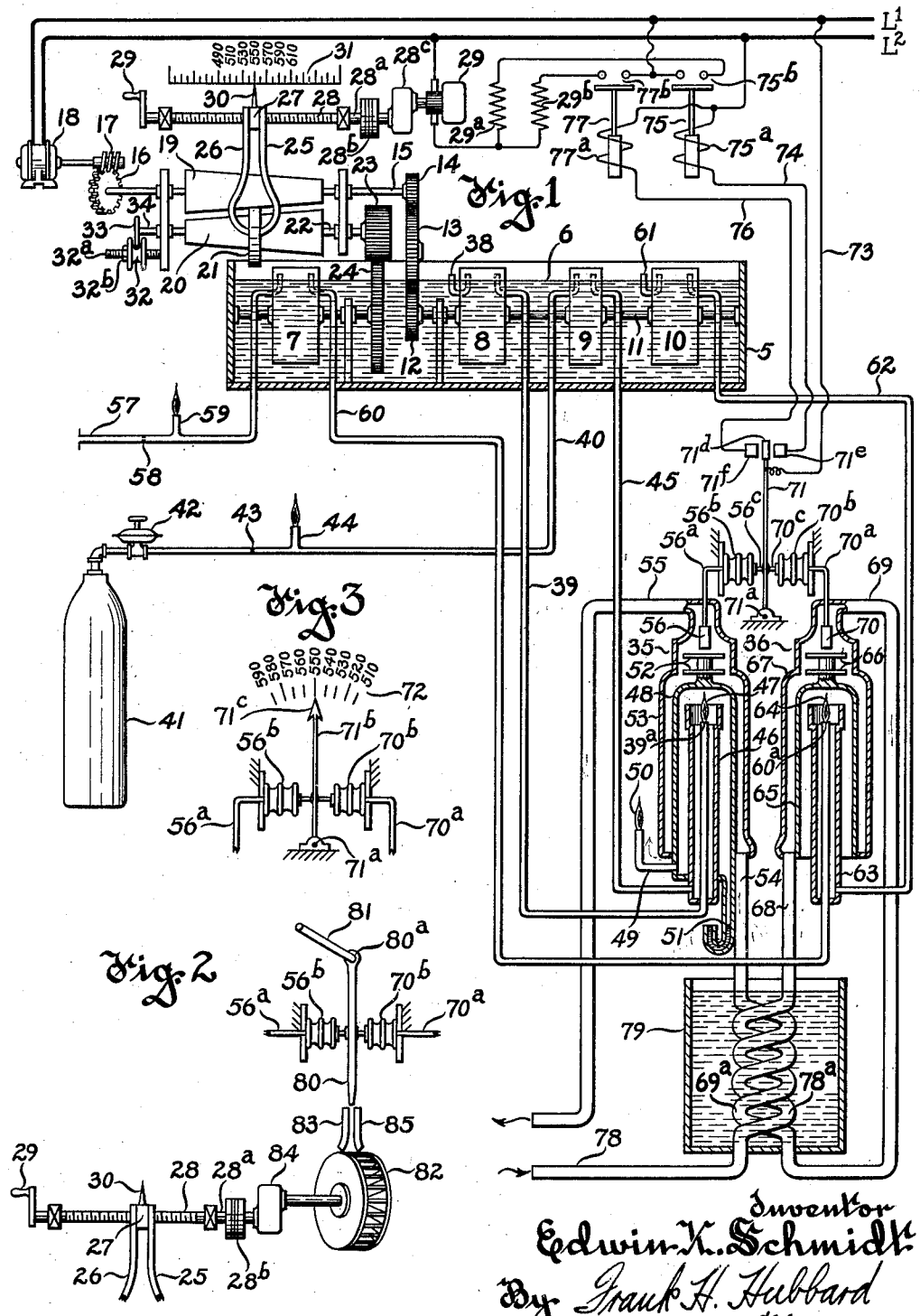

2,120,791

UNITED STATES PATENT OFFICE 2,120,791

METHOD OF AND APPARATUS FOR DETERMINING THE HEATING VALUE OF COMBUSTIBLE GASEOUS FLUIDS

Edwin X. Schmidt, Whitefish Bay, Wis., assignor to Cutler-Hammer, Inc., Milwaukee, Wis., a corporation of Delaware Application December 12, 1934, Serial No. 757,100

12 Claims. (Cl. 73—190)

This invention relates to improvements in methods of and apparatus for determining the heating value of combustible gaseous fluids.

An object of the invention is to provide simple and inexpensive methods and apparatus of the aforementioned character which are inherently adapted to compensate for variations in barometric pressure and atmospheric temperature conditions.

Another object is to provide novel methods and apparatus for continuously comparing the heating effects produced by combustion of a test fluid and by combustion of a fluid of known heating value to provide for ascertainment of the heating value of the former.

Another object is to provide novel methods of and apparatus for continuously determining and/or indicating the heating value per unit volume of a flowing combustible gas.

Another object is to provide novel methods of and apparatus for continuously determining and/or indicating the heating value per unit volume of a flowing combustible gas under conditions adapted to compensate for variations in temperature, pressure and saturation thereof.

Another object is to provide novel methods of and apparatus for continuously ascertaining and comparing the heating effects produced by combustion of a flow of test gas and of a flow of gas of known heating value per unit volume.

Another object is to provide novel methods and apparatus of the character just mentioned wherein the relative volumetric rates of flow of the test gas and the gas of known heating value per unit volume are varied in accordance with and to compensate for variations in the differential value of said heating effects, whereby said differential value is maintained substantially constant.

Another object is to provide novel methods and apparatus of the character just mentioned wherein the values of such variations in the relative volumetric rates of flow of the test gas and the gas of known heating value per unit volume are utilized as a continuous measure of the heating value per unit volume of the test gas.

Another and more specific object is to provide an accurate calorimeter of the portable type.

Other objects and advantages of the invention will hereinafter appear.

The accompanying drawing illustrates certain embodiments of the invention which will now be described, it being understood that the invention is susceptible of embodiment in other forms without departing from the scope of the appended claims.

In the drawing Fig. 1 illustrates schematically and diagrammatically a calorimeter constructed in accordance with my invention.

Fig. 2 is a fragmentary view illustrating schematically a modified form of device for automatically varying the relative volumetric rates of flow of the test gas and the gas of known heating value per unit volume, and Fig. 3 is a fragmentary view illustrating schematically a modified form of certain of the parts shown in Fig. 1.

Referring first to Fig. 1, the numeral 5 designates a tank which is adapted to be filled with water or other suitable liquid to a predetermined level, as represented by the line 6. Any suitable means such as a reserve supply of the liquid and an overflow outlet (not shown) may be provided for maintaining the level 6; or the body of liquid may be replenished at will to maintain the level thereof between certain limits.

Located within tank 5, and preferably partially submerged to like degrees within the body of liquid 6 are four wet displacement meters or pumps designated by the numerals 7, 8, 9 and 10. The body of water or other liquid 6 forms a seal for all of said meters and also functions to equalize the temperatures and the degrees of saturation of the gaseous fluids supplied by or passing through the respective meters. Meters 8, 9 and 10 are mounted upon a common driven shaft 11. Keyed or otherwise rigidly secured to shaft 11 is a gear 12, which is driven (through gears 13, 14 shaft 15, pinion 16 and worm 17) by an electric motor 18 which is supplied with energy from a suitable source represented by lines $L^1$, $L^2$. Meter 7 is likewise driven by motor 18 through worm 17, pinion 16, cone pulleys 19 and 20 having an interposed adjustable idler ring 21, shaft 22 and gears 23 and 24.

The idler 21 is preferably manually adjustable in either direction longitudinally of the pulleys 19 and 20 as by means of the guide arms 25 and 26 carried by the traveling nut 27, which is movable in either direction along the screw 28 upon rotation of the latter by handle or crank 29. In order to permit such manual adjustment of idler 21 a slip clutch connection 28[b] is interposed between the right hand end 28[a] of screw member 28 and a set of speed-reducing gearing 28[c] which is adapted to be driven by a motor 29 under certain conditions as hereinafter described. Nut 27 as shown is provided with an indicator or pointer 30, and a scale 31 is associated therewith, said scale 31 being calibrated or adjusted in position in accordance with the known heating value per unit volume of one of the combustible gaseous fluids hereinafter referred to. For instance, if it is known that the heating value per cubic foot of the gas to be tested is approximately 550 B. t. u. and that the heating value per unit volume of the air supplied by meter 8 when burned in an excess of the combustible fluid of known combustion characteristics supplied by meter 9 is 110 B. t. u. per cubic foot, I prefer to initially set the pointer 30 at that point on scale 31 marked "550".

Meters 7 and 8 are preferably of identical size and construction, so that any possible change in the level of liquid 6 will affect the capacities of both of said meters to like degrees. The arrangement is preferably such that with pointer 30 set at the point aforementioned the meter 7 will have one-fifth the speed of meter 8 and therefore the delivery from meter 7 will be one-fifth as great as the delivery from meter 8. However, in practice I prefer to check the delivery rates of meters 7 and 8 by a suitable arrangement of alternative conduits and by a temporary change in gearing (not shown) to equalize the speeds of meters 7 and 8 whereby air may be passed through and from meter 7 into meter 8, a sensitive pressure gage (not shown) being subjected to the pressure of fluid in the connecting conduit. If the capacities or rates of delivery of meters 7 and 8 under the conditions last mentioned are found to be unequal, they may be made equal by adjusting the collar 32 which engages a disk or flange 33 on the left hand end of shaft 34 to which cone pulley 20 is attached, whereby pulley 20 may be moved in either direction along its axis. Gear 23 is made relatively wide to provide for such adjustment. It is to be understood that collar 32 has threaded engagement with rod 32$^a$, and if desired a nut 32$^b$ may be provided to lock collar 32 in any adjusted position thereof.

The device further comprises a pair of calorimeters designated in general by the numerals 35 and 36. In calorimeter 35 a meter sample of air is burned in the presence of a metered excess flow of oxygen-free gas. In calorimeter 36 a metered sample of test gas is burned in the presence of a metered excess flow of air. Thus I have shown the air meter 8 as provided with an inlet 38 opening to atmosphere, said meter discharging through a pipe 39 whose discharge end 39$^a$ forms a burner tip within calorimeter 35. The intake of meter 9 comprises a pipe 40 which is connected with any suitable source of supply of an oxygen-free gas of known or predetermined combustion characteristics. Said oxygen-free gas may be natural gas or hydrogen, or butane or propane vapor. In fact I may employ almost any gas which when supplied in excess of that required for complete combustion of the air supplied will liberate a fixed known quantity of heat per standard cubic foot of such air. In the illustrated example, it may be assumed that the bottle or tank 41 contains hydrogen which is discharged therefrom through a suitable form of pressure reducing valve 42; suitable means, such as the internal orifice plate or baffle 43 and the vent-pipe or burner 44, being provided to insure substantially atmospheric pressure of the hydrogen supply at the inlet end of said pump 9. The outlet of pump 9 is connected by pipe 45 with a tube 46 surrounding that portion of pipe 39 located within calorimeter 35, tube 46 having a closed lower end and an open upper end.

Combustion of the air supplied by meter 8 in the presence of the excess flow of hydrogen supplied by meter 9 takes place within a chamber formed by a tubular metal member 48, said member having a closed upper end and the same having a vent pipe 49 at its lower end to provide for escape to atmosphere of the combustion products. The escaping products of combustion may be ignited, as indicated by flame 50, to prevent contamination of the room by the aforementioned excess of hydrogen or other oxygen-free gas employed. Chamber 48 is preferably provided at its lower end with a tube 51 of the form shown to provide for drainage of any condensed vapor or vapors, the condensate itself forming a seal for said tube, as will be apparent.

The member 48 is preferably provided at its upper end with a plurality of heat-dissipating vanes or flanges 52. Member 48 is surrounded by a jacket 53 through which a heat-exchanging medium, such as water, is adapted to flow. Said flow of water is adapted to enter the lower end of jacket 53 through pipe 54 and to leave the upper end of said jacket through pipe 55. Located within the upper end of jacket 53 is the bulb 56 of an expansible fluid thermometer, said bulb communicating through pipe 56$^a$ with a metal bellows 56$^b$ of well known form.

The combustible gas the heating value per unit volume of which it is desired to ascertain is supplied through pipe 57 to the inlet of meter 7, said pipe being provided with an internal orifice plate 58 and a vent-pipe 59, which may serve as a burner tip, to insure atmospheric pressure of the test gas sample. Meter 7 discharges through a pipe 60 whose discharge end 60$^a$ forms a burner tip within calorimeter 36. The air meter 10 is provided with an inlet 61 opening to atmosphere, said meter discharging through a pipe 62 which communicates with the closed lower end of a tube 63 forming part of calorimeter 36. As aforestated the test gas sample supplied through pipe 60 is burned within the excess flow of air supplied through pipe 62, the flame being indicated at 64. The combustion chamber of calorimeter 36 comprises a tubular member 65 surrounding tube 63, member 65 having a closed upper end. The lower end of member 65 is open to permit escape of the combustion products to atmosphere.

Member 65 is likewise preferably provided at its upper end with a plurality of heat dissipating vanes or flanges 66, and said member is surrounded by a jacket 67 through which the aforementioned heat-exchanging medium, such as water, is adapted to flow. Said flow of water is adapted to enter the lower end of jacket 67 through pipe 68 and to leave the upper end of said jacket through pipe 69. Located within the upper end of jacket 67 is the bulb 70 of an expansible fluid thermometer, said bulb communicating through pipe 70$^a$ with a metal bellows 70$^b$.

The aforedescribed thermometers (56, 70) are preferably of identical construction, and the same are calibrated to respond in a like manner under given temperature conditions. The same are mounted as shown with the bellows members 56$^b$, 70$^b$ thereof alined with but spaced from each other. A member 71 is pivotally supported at point 71$^a$ below and equidistant from the adjacent ends of members 56$^b$ and 70$^b$. A short rod or stud 56$^c$ is interposed between and attached to member 56$^b$ and to one side of member 71, and a like rod 70$^c$ is interposed between and attached to member 70$^b$ and to the opposite side of member 71. The arrangement is preferably such that member 71 will be maintained in the vertical position thereof illustrated when the bulbs 56 and 70 are subjected to like heating effects or equal temperature conditions.

The arrangement is preferably such that the volume of test gas burned in calorimeter 36 per unit of time is initially in fixed volumetric relation to the volume of air delivered by meter 8 and burned in calorimeter 35 per unit of time. It is therefore apparent that if the heating value per unit volume of the test gas burned in calorimeter 36 is equal to the known heating value per unit volume of the air burned in calorimeter 35 in the manner aforedescribed, multiplied by the known ratio of volumetric delivery rates of meters 7 and 8, the degrees of heat transferred to bulbs 56 and 70 will be equal to each other, with consequent maintenance of member 71 in the vertical position thereof illustrated. If the heating value per unit volume of the test gas burned in calorimeter 36 is greater than the known heating value per unit volume of the air burned in calorimeter 35, multiplied by the ratio of volumetric delivery rates of meters 7 and 8, the degree of heat transferred to bulb 70 will exceed, by a corresponding amount, the degree of heat transferred to bulb 56, with a resultant movement of member 71 toward the left, or in a counterclockwise direction.

In the arrangement illustrated in Fig. 3 I provide a member 71$^b$ having an arrow-head or pointer 71$^c$ at the upper end thereof for cooperation with a suitably calibrated dial 72 whereby the position of the pointer 71$^c$ may be utilized to indicate directly the instantaneous heating value per unit volume of the gas burned in calorimeter 36. Obviously if desired the member 71$^b$ might be provided with a suitable pen for cooperation with a suitably calibrated continuously movable record strip or chart (not shown) to provide a continuous record of the instantaneous heating value per unit volume of test gas.

With the device of Fig. 1 modified in the manner illustrated in Fig. 3, I may alternatively utilize the dial 72 only to indicate the direction of divergence in value of the degree of heat transferred to bulb 70 as compared with the value of the degree of heat transferred to bulb 56, the aforementioned handle 29 being manually operated in the required direction to vary the volumetric rate of flow of test gas supplied by meter 7 with respect to the volumetric rate of flow of air supplied by meter 8, to effect return of member 71$^b$ (Fig. 3) to the vertical position thereof illustrated. Under these conditions the position of member 71$^b$ will not be utilized to indicate the heating value per unit volume of test gas, but the position of the pointer 30 with reference to scale 31 will then afford an accurate measure of the instantaneous heating value per unit volume of test gas.

In the arrangement shown in Fig. 1, however, I provide the member 71 at its upper end with a contactor 71$^d$ which is movable in either direction into engagement with one or the other of the stationary contacts 71$^e$ or 71$^f$. Contactor 71$^d$ is connected by conductor 73 with line L$^1$, contact 71$^e$ is connected with line L$^2$ by conductor 74 through the operating winding 75$^a$ of a relay 75; and contact 71$^f$ is connected with line L$^2$ by conductor 76 through the operating winding 77$^a$ of a relay 77. Relay 75 is provided with normally open contacts 75$^b$ adapted when closed to complete an energizing circuit for motor 29 through one of the split-field windings 29$^a$ thereof, whereby said motor is operated in a direction to increase the volumetric rate of supply of the test gas by effecting movement of nut 27 and idler 21 toward the left. Relay 77 is provided with normally open contacts 77$^b$ adapted when closed to complete an energizing circuit for motor 29 through the other of its split-field windings 29$^b$, whereby said motor is operated in a direction to decrease the volumetric rate of supply of the test gas by effecting movement of nut 27 and idler 21 toward the right.

Motor 29 is thus operated automatically in an obvious manner to so vary the volumetric rate of flow of test gas as to maintain substantially equal the values of the heating effects produced by the combustions which take place in calorimeters 35 and 36. The pointer 30 associated with or carried by nut 27 will therefore serve in conjunction with scale 31 to indicate continuously the instantaneous heating value per unit volume of the test gas burned in calorimeter 36. If desired the pointer 30 may have associated therewith a pen for cooperation with a suitably calibrated movable strip or chart (not shown) to provide a continuous record of the instantaneous heating value per unit volume of the test gas. Recording devices of the character just mentioned are well known in the art, and a showing thereof is believed unnecessary to a clear understanding of my invention and the aforementioned obvious modifications of my disclosure.

The heat-exchanging medium aforementioned comprises water or other suitable fluid which is supplied from a suitable source through pipe 78, temperature equalizing coil 78$^a$ and pipe 68 to the lower end of jacket 67 of calorimeter 36. After passing the exit thermometer bulb 70 the water flows from pipe 69 through a second temperature equalizing coil 69$^a$, by pipe 54 to the lower end of jacket 53 of calorimeter 35. After passing the exit thermometer 56 the water may flow to waste through pipe 55. The aforementioned temperature equalizing coils 69$^a$ and 78$^a$ are located within a body of water, for instance, in a container or tank 79.

It should be noted that the operation of the instrument is independent of the volumetric rate of flow of the water or other heat-exchanging medium through the calorimeter jackets, except that relatively wide variations in said volumetric rate of flow will to some extent affect the sensitivity or rapidity of response of member 71. It should also be noted that pipe 55 might be connected to pipe 78 through a power driven pump, in which case it might be desirable to provide cooling vanes or an otherwise increased cooling surface upon the temperature equalizing tank 79.

In the fragmentary view of Fig. 2 the parts corresponding to those in Fig. 1 are given like numerals of reference. Fig. 2 differs from Fig. 1 only in respect of the substitution of fluid pressure operating means for the electrical operating means aforedescribed. Thus in Fig. 2 I have shown a nozzle 80 which is pivotally supported at a point 80$^a$ above and equally spaced from the adjacent ends of members 56$^b$ and 70$^b$. Nozzle 80 is supplied with air or other fluid under pressure from a suitable source represented by pipe 81. When heating effects of equal value are produced by the aforedescribed combustion of fluids in calorimeters 35 and 36 nozzle 80 will be maintained in the neutral or intermediate position thereof illustrated, in which case no impelling force is applied to the vane-wheel or rotor 82 by the compressed air or other fluid discharged from nozzle 80.

In the event that the heating effect produced in calorimeter 36 is of greater value than the heating effect produced in calorimeter 35, the preponderance of the pressure of the fluid in member 70ᵇ will cause movement of nozzle 80 toward the left into registry with a guide tube 83 whose curved lower end directs all or a part of the stream of compressed air into impelling relation to the vane-wheel 82 to effect rotation thereof in one direction. Wheel 82 therefore acts through gearing 84 and slip-clutch 28ᵇ to rotate screw 28 to effect movement of nut 27 toward the right to decrease the volumetric rate of supply of test gas until the values of the heating effects produced in said calorimeters are again equalized. Pointer 30 acts in conjunction with scale 31 (Fig. 1) as aforedescribed to indicate the instantaneous heating value per unit volume of the test gas.

In like manner, if the value of the heating effect produced in calorimeter 36 is less than the value of the heating effect produced in calorimeter 35 nozzle 80 will be moved toward the right to register with guide tube 85 with consequent rotation of wheel 82 in the reverse direction. Nut 27 will thus be moved toward the left to increase the volumetric rate of supply of test gas until the values of the heating effects produced in said calorimeters are again equalized, pointer 30 moving at the same time toward the left to indicate the instantaneous heating value per unit volume of the test gas.

Referring again to Fig. 1, it is obvious that if desired the meter 8 could be employed to supply to calorimeter 35 a combustible gas other than air, provided that the exact heating value per unit volume of such gas is known. Under such conditions the meter 9 or a similar meter would be employed to supply air to support combustion of said gas within calorimeter 35.

It will be apparent to those skilled in the art that due to the simplicity of my device the several parts thereof may be made so small and light in weight as to provide for portability of the complete equipment.

It is to be understood that any well known means may be provided for igniting the fluids within the respective calorimeters, either electric spark generating means of known form, or means to temporarily render the calorimeter burners accessible for ignition of the fluids by means of a match flame or the like.

What I claim as new and desire to secure by Letters Patent is:

1. The method in calorimetry, which comprises effecting combustion of an initially volumetrically constant continuous flow of combustible fluid in the presence of a volumetrically proportional flow of fluid adapted to support combustion thereof, continuously ascertaining the instantaneous heating effect produced by such combustion, simultaneously effecting combustion of a continuous and volumetrically constant proportional flow of a combustible fluid of known heating value per unit volume in the presence of a volumetrically proportional flow of fluid adapted to support combustion of the latter, continuously ascertaining the instantaneous heating effect produced by such last mentioned combustion, maintaining the products of the first mentioned and last mentioned combustions separate from each other, utilizing a single separate flow of fluid for continuously ascertaining the differential value of the heating effects aforementioned, varying the volumetric proportionality between said flows of combustible fluids in accordance with and to compensate for variations in said differential value of the instantaneous heating effects aforementioned, whereby said differential value is maintained substantially constant, and utilizing the value of the variations in such volumetric proportionality as a continuous measure of the heating value per unit volume of said first mentioned combustible fluid.

2. The method in calorimetry, which comprises effecting a continuous flow of combustible fluid the heating value per unit volume of which is to be ascertained, effecting combustion of said fluid in the presence of a volumetrically constant flow of air in excess of that required to effect complete combustion thereof, effecting a second separate and volumetrically constant flow of air, effecting combustion of said second flow of air in the presence of a volumetrically proportioned flow of oxygen-free fluid in excess of that required to effect complete combustion thereof to provide a continuous heating effect of predetermined value, the fluids in all of said flows being supplied under like conditions of temperature, pressure and saturation, utilizing a single continuous additional flow of fluid to ascertain the difference between the value of the heating effect produced by the combustion first mentioned and said heating effect of predetermined value and utilizing said difference as a measure of the heating value per unit volume of said first mentioned fluid.

3. The method in calorimetry, which comprises effecting a continuous flow of combustible fluid the heating value per unit volume of which is to be ascertained, effecting continuous combustion of said fluid in the presence of a continuous and volumetrically constant flow of air in excess of that required to effect complete combustion thereof, effecting a second continuous flow of air which is separate from and volumetrically proportional to said first mentioned flow of air, effecting continuous combustion of said second flow of air in the presence of a volumetrically proportioned flow of oxygen-free fluid in excess of that required to effect complete combustion thereof to provide a continuous heating effect of predetermined value, the fluids in all of said flows being supplied under like conditions of temperature, pressure and saturation, effecting a continuous single flow of liquid in heat exchanging relation to but separated from the products of the respective combustions aforementioned in a manner to accurately ascertain the difference between the value of the heating effect produced by the combustion first mentioned and said heating effect of predetermined value, and utilizing the value of said difference as a measure of the heating value per unit volume of said first mentioned fluid.

4. The method in calorimetry, which comprises effecting combustion of a continuous volumetrically constant flow of fluid of known heating value per unit volume in the presence of a continuous volumetrically proportional flow of fluid adapted to support combustion thereof to provide a heating effect of constant predetermined value, simultaneously effecting combustion of an initially volumetrically proportional continuous flow of fluid of unknown heating value per unit volume in the presence of a volumetrically constant continuous flow of fluid adapted to support combustion thereof, all of said fluids being supplied under like conditions of temperature, pressure and saturation thereof, continuously ascertaining the value of the heating effect produced by the combustion last mentioned, the products of said first mentioned and last mentioned combustions being maintained separate from each other, utilizing a single separate flow of fluid for continuously ascertaining the differential value of the aforementioned heating effects, varying the volumetric proportionality between the flow of said fluid of unknown heating value per unit volume and the remaining flows in accordance with and to compensate for variations in said differential value whereby the latter is maintained substantially constant, and utilizing the value of the variations in said volumetric proportionality as a measure of the heating value per unit volume of said fluid of unknown heating value.

5. In a calorimeter, in combination, a pair of burners, means for supplying to and effecting combustion in one of said burners of a continuous flow of combustible fluid, means for continuously ascertaining the instantaneous heating effect produced by such combustion, means for simultaneously supplying to and effecting combustion in the other of said burners of a continuous volumetrically proportional flow of a combustible fluid of known heating value per unit volume, means for continuously ascertaining the instantaneous heating effect produced by such last mentioned combustion, means including a single continuous flow of liquid for continuously ascertaining and comparing instantaneous values of the heating effects so produced, said last mentioned means being also operable automatically for continuously indicating the result of such comparison to provide for continuous ascertainment of the instantaneous heating value per unit volume of said fluid first mentioned and means for maintaining separate from each other and from said liquid flow the products of said first mentioned and second mentioned combustions.

6. In a calorimeter, in combination, a pair of burners, means for supplying to and effecting combustion in one of said burners of a continuous flow of combustible fluid and a volumetrically constant flow of fluid adapted to support combustion thereof, means for continuously ascertaining the heating effect produced by such combustion, means for simultaneously supplying to and effecting combustion in the other of said burners of a continuous volumetrically proportional flow of a combustible fluid of known heating value per unit volume and a volumetrically constant flow of fluid adapted to support combustion of the latter, said flows of combustion supporting fluid being separate from each other and the same being volumetrically proportional to said last mentioned flow of combustible fluid, means for continuously ascertaining the heating effect produced by said last mentioned combustion, means including a separate flow of fluid for continuously ascertaining and comparing the values of the heating effects so produced, and means for continuously indicating the result of such comparison to provide for ascertainment of the heating value per unit volume of said first mentioned fluid.

7. In a calorimeter, in combination, a pair of burners, means for supplying to and effecting combustion in one of said burners of a continuous flow of combustible fluid in the presence of an excess flow of combustion supporting fluid individual thereto, means for continuously ascertaining the heating effect produced by such combustion, means for simultaneously supplying to and effecting combustion in the other of said burners of a continuous volumetrically proportional flow of a combustible fluid of known heating value per unit volume in the presence of an excess flow of combustion supporting fluid individual to the latter, means for continuously ascertaining the heating effect produced by said last mentioned combustion, means including a single separate flow of fluid for continuously ascertaining the differential value of the heating effects aforementioned, means operable automatically in response to variations in said differential value to effect a corresponding variation in the volumetric proportionality of said fluid flows, whereby said differential value is maintained substantially constant, and means for utilizing the value of the variations in such volumetric proportionality so effected as a continuous measure of the heating value per unit volume of said first mentioned fluid.

8. In a calorimeter, in combination, means for effecting a continuous flow of a combustible fluid the heating value per unit volume of which is to be ascertained, means for effecting continuous combustion of said fluid in the presence of a volumetrically constant flow of air in excess of that required to effect complete combustion thereof, means for effecting a second continuous flow of air which is volumetrically proportional to said first mentioned flow of air, means for effecting continuous combustion of said second flow of air in the presence of a volumetrically proportioned continuous flow of oxygen-free fluid in excess of that required to effect complete combustion thereof to provide a continuous heating effect of predetermined value, means for subjecting all of said fluids to like conditions of temperature, pressure and saturation prior to combustion thereof, means including a flow of fluid separate from all of the flows aforementioned for continuously ascertaining and indicating the difference between the value of the heating effect produced by the combustion first mentioned and said heating effect of predetermined value, and means for utilizing the indicated value of said difference as a continuous measure of the heating value per unit volume of said first mentioned fluid.

9. In a calorimeter, in combination, means for effecting a continuous flow of combustible fluid the heating value per unit volume of which is to be ascertained, means for effecting continuous combustion of said fluid in the presence of a volumetrically constant flow of air in excess of that required to effect complete combustion thereof, means for effecting a second continuous flow of air which is volumetrically proportional to said first mentioned flow of air, means for effecting continuous combustion of said second flow of air in the presence of a volumetrically proportioned continuous flow of oxygen-free fluid in excess of that required to effect complete combustion thereof to provide a continuous heating effect of predetermined value, means for subjecting all of said fluids to like conditions of temperature, pressure and saturation prior to combustion thereof, means for effecting a single flow of fluid separate from all of the flows aforementioned to provide for continuous ascertainment of the difference between the value of the heating effect produced by the combustion first mentioned and said heating effect of predetermined value, and thermally-expansible means operable automatically in accordance with variations in the value of said difference and adapted to indicate continuously the heating value per unit volume of said first mentioned fluid.

10. In a calorimeter, in combination, means for effecting a continuous flow of combustible fluid the volume of which is initially predetermined and the heating value per unit volume of which is to be ascertained, means for effecting combustion of said fluid in the presence of a volumetrically constant flow of air in excess of that required to effect complete combustion thereof, means for effecting a second flow of air which is separate from and volumetrically proportional to said first mentioned flow of air, means for effecting combustion of said second flow of air in the presence of a volumetrically proportioned flow of oxygen-free fluid in excess of that required to effect complete combustion thereof to provide a continuous heating effect of predetermined value, means for subjecting all of said fluids to like conditions of temperature, pressure and saturation prior to combustion thereof, means for effecting a single continuous flow of fluid separate from but in heat exchanging relation to the products of the combustions aforementioned to provide for ascertainment of the differential value of the heating effects produced thereby, associated means operable automatically in accordance with and to compensate for variation in said differential value to effect corresponding variations in the volumetric rate of flow of said first mentioned fluid whereby said differential value is maintained substantially constant, and means for utilizing the value of the variations in the volumetric rate of flow of said first mentioned fluid as a measure of the heating value per unit volume thereof.

11. In a device of the character described, in combination, a pair of calorimeters, means for supplying to the respective calorimeters under like conditions of temperature, pressure and saturation initially volumetrically proportioned flows of combustible fluids and separate volumetrically proportioned flows of fluids respectively adapted to support combustion of the former, one of said combustible fluids being of known heating value per unit volume and the other of said combustible fluids being of unknown heating value per unit volume, means for effecting combustion of said fluids in the presence of their respective combustion supporting fluids within said calorimeters, means including a flow of fluid separate from all of the flows aforementioned and responsive continuously to variations in the differential value of the heating effects produced by such combustion for automatically effecting variation in the relative volumetric rates of flow of said combustible fluids whereby said differential value is maintained substantially constant, associated thermally-expansible temperature responsive means for continuously ascertaining the value of the variations in said relative volumetric rates of flow, and means for utilizing the said last mentioned value as a continuous measure of the heating value per unit volume of said combustible fluid of unknown heating value.

12. In a device of the character described, in combination, a pair of calorimeters, means for supplying to the respective calorimeters under like conditions of temperature, pressure and saturation initially volumetrically proportioned flows of combustible fluids and continuous volumetrically constant flows of fluids respectively adapted to support combustion of the former, one of said combustible fluids being of known heating value per unit volume and the other of said combustible fluids being of unknown heating value per unit volume, means for effecting continuous combustion of said fluids in the presence of their respective combustion supporting fluids within said calorimeters, means for effecting a single continuous flow of water through said calorimeters in sequence in heat exchanging relation to but separated from the products of combustion in the latter, means for effecting a heat exchange between said flow of water prior to its passage through one of said calorimeters and the same flow prior to its passage through the other of said calorimeters, thermally-expansible temperature responsive means having a part thereof located in the exit of said flow of water from one of said calorimeters, a second thermally-expansible temperature responsive means having a part thereof located in the exit of said flow of water from the other of said calorimeters, means controlled by said temperature responsive means jointly and thereby rendered responsive to variations in the differential value of the heating effects produced by such combustions for automatically effecting variations in the relative volumetric rates of flow of said combustible fluids whereby said differential value is maintained substantially constant, associated means for continuously ascertaining the value of the variations in said relative volumetric rates of flow, and means for utilizing said last mentioned value as a continuous measure of the heating value per unit volume of said combustible fluid of unknown heating value.

EDWIN X. SCHMIDT.